US011258622B2

(12) United States Patent
Christian et al.

(10) Patent No.: US 11,258,622 B2
(45) Date of Patent: Feb. 22, 2022

(54) MULTIPLEXING MESSAGE DISTRIBUTION WITHIN GROUP-BASED COMMUNICATION SYSTEM

(71) Applicant: Slack Technologies, Inc., San Francisco, CA (US)

(72) Inventors: Mark Christian, San Francisco, CA (US); Cyrus Katrak, San Francisco, CA (US)

(73) Assignee: Slack Technologies, LLC, San Francisco, CA (US)

( * ) Notice: Subject to any disclaimer, the term of this patent is extended or adjusted under 35 U.S.C. 154(b) by 135 days.

(21) Appl. No.: 16/714,105

(22) Filed: Dec. 13, 2019

(65) Prior Publication Data
US 2020/0195458 A1 Jun. 18, 2020

Related U.S. Application Data

(63) Continuation of application No. 15/990,454, filed on May 25, 2018, now Pat. No. 10,547,466.

(51) Int. Cl.
H04B 7/00 (2006.01)
H04L 12/18 (2006.01)
H04L 65/611 (2022.01)
H04W 4/06 (2009.01)

(52) U.S. Cl.
CPC .......... H04L 12/185 (2013.01); H04L 12/189 (2013.01); H04L 65/4076 (2013.01); H04W 4/06 (2013.01)

(58) Field of Classification Search
CPC ... H04W 4/06; H04W 28/02; H04W 28/0263; H04W 28/0273; H04W 72/0453; H04L 12/1822; H04L 12/189; H04L 12/54; H04L 12/5855; H04L 65/4076; H04L 65/60
USPC ........................................ 370/310, 328, 329
See application file for complete search history.

(56) References Cited

U.S. PATENT DOCUMENTS

| 8,885,649 | B2 | 11/2014 | Chen et al. |
| 9,088,559 | B2 | 7/2015 | Ma et al. |
| 9,335,958 | B2 | 5/2016 | Anno et al. |
| 9,350,763 | B1 | 5/2016 | McHugh et al. |
| 9,462,089 | B1 * | 10/2016 | Fallows .................. H04L 69/14 |
| 9,882,959 | B2 * | 1/2018 | Chow .................. H04L 67/2814 |
| 10,346,378 | B1 * | 7/2019 | Jones .................. G06F 16/2228 |

(Continued)

OTHER PUBLICATIONS

Tamplin, A Multiplexing Extension for Websockets, IETF, Jul. 2013, pp. 1-42.

(Continued)

Primary Examiner — Dmitry Levitan
(74) Attorney, Agent, or Firm — Erise IP, P.A.

(57) ABSTRACT

Various embodiments are directed to message distribution protocols for a group-based communication platform, in which messages exchanged within a plurality of individual communication channels are provided to client devices via a single websocket connection for each client device. The messages are provided together with associated correspondence tags identifying communication channels in which the messages are exchanged, and the client device disseminates those messages for display in appropriate communication-channel-specific display windows based at least in part on the correspondence tags transmitted with the messages.

24 Claims, 6 Drawing Sheets

(56) References Cited

U.S. PATENT DOCUMENTS

| | | | | |
|---|---|---|---|---|
| 10,531,243 | B2* | 1/2020 | Park | H04W 76/11 |
| 10,547,466 | B2* | 1/2020 | Christian | H04L 65/4076 |
| 10,826,996 | B2* | 11/2020 | Wood | G06F 15/00 |
| 10,873,587 | B2* | 12/2020 | Kuperman | G06F 21/602 |
| 2012/0284638 | A1* | 11/2012 | Cutler | G06Q 10/00 |
| | | | | 715/751 |
| 2013/0254806 | A1* | 9/2013 | Alam | H04N 21/482 |
| | | | | 725/38 |
| 2015/0199312 | A1* | 7/2015 | Li | G06F 16/958 |
| | | | | 715/234 |
| 2015/0271233 | A1 | 9/2015 | Bouazizi | |
| 2016/0191482 | A1* | 6/2016 | Truelove | H04L 63/0807 |
| | | | | 726/9 |
| 2017/0149915 | A1 | 5/2017 | Jolfaei | |
| 2018/0287982 | A1 | 10/2018 | Draeger et al. | |
| 2019/0020723 | A1 | 1/2019 | Kumar et al. | |
| 2020/0195458 | A1* | 6/2020 | Christian | H04L 12/1859 |

OTHER PUBLICATIONS

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

"How Slack changed the way we work by putting the customer experience first", Repeat Customer Podcast, Episode 3, [online][retrieved May 9, 2019], Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 17 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", Fujitsu Sci. Tech. J., 36, 2, (Dec. 2000) 154-161.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

\* cited by examiner

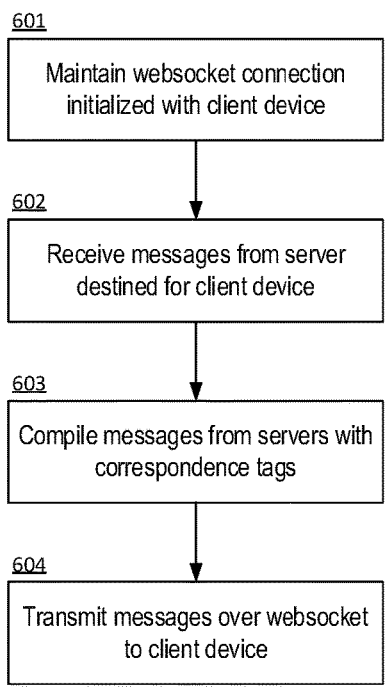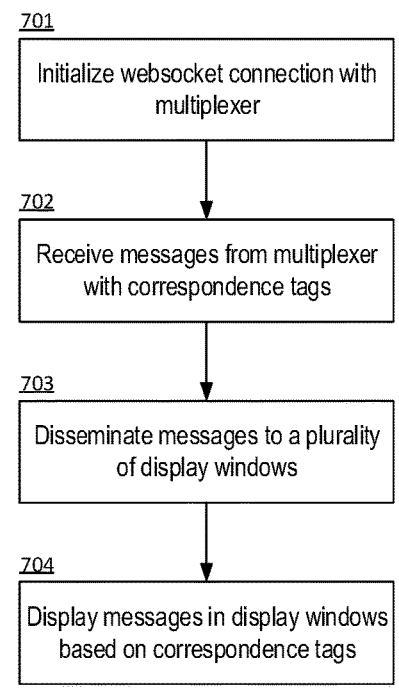
FIG. 6
FIG. 7

MULTIPLEXING MESSAGE DISTRIBUTION WITHIN GROUP-BASED COMMUNICATION SYSTEM

CROSS-REFERENCE TO RELATED APPLICATIONS

This patent application is a continuation of U.S. application Ser. No. 15/990,454, filed May 25, 2018, which is incorporated herein by reference in its entirety.

BACKGROUND

Systems have been provided for disseminating shared content messages within a communication interface among a plurality of client devices via an at least partially centralized messaging server system.

Through applied effort, ingenuity, and innovation, many of these identified deficiencies and problems have been solved by developing solutions that are in accordance with the embodiments of the present invention, many examples of which are described in detail herein

BRIEF SUMMARY

Various embodiments provide multiplexing mechanisms for transmitting a plurality of communication messages (e.g., textual messages, file transfers, real-time calls, and/or the like) destined for a plurality of discrete communication targets (e.g., communication interfaces) within a single client device via a single websocket connection between a centralized messaging server system and the client device. Once the messages are received at the target client device, the target client device disseminates the messages for display to a user in association with the respective communication targets. For example, messages provided to a client device within the context of a first conversation (e.g., displayable within a first discrete window) and messages provided to the same client device within the context of a second conversation (e.g., displayable within a second discrete window), may be transmitted to the client device over a common websocket connection and then disseminated for display within the appropriate communication windows once received at the client device.

Various embodiments are directed to a message distribution system for disseminating messages to client devices in association with a group-based communication platform. In certain embodiments, the system comprises: one or more message distribution servers configured for directing messages shared among client devices within communication channels; and at least one multiplexer. The multiplexer may be configured to: maintain a websocket connection with a client device of the plurality of client devices; and transmit a plurality of messages shared within respective communication channels from the one or more message distribution servers to the client device via the websocket connection, wherein each of the plurality of messages comprises a correspondence tag identifying a respective communication channel for display of the respective message on the client device within a display window corresponding to the communication channel.

In certain embodiments, the multiplexer maintains a plurality of backend websocket connections with the one or more message distribution servers, wherein the backend websocket connections each correspond with a communication channel. Moreover, a message of the plurality of messages may comprise a plurality of correspondence tags identifying a plurality of communication channels for display of the respective message. In certain embodiments, the multiplexer is further configured to: receive an authentication token from the client device identifying a plurality of communication channels subscribed to by the client device; and transmit a plurality of messages shared within subscribed communication channels from the one or more message distribution servers to the client device via the websocket connection. Moreover, the multiplexer may be further configured to receive a plurality of join request messages from the client device, wherein each join request identifies a communication channel to be joined by the client device; and transmit a plurality of messages shared within the joined communication channels from the one or more message distribution servers to the client device via the websocket connection.

In certain embodiments, maintaining the websocket connection comprises: initializing the websocket connection in response to a first trigger event to enable transmission of messages to the client device; closing the websocket connection in response to a second trigger event; and storing a plurality of messages in a buffer memory while the websocket connection is closed, such that the plurality of messages stored in the buffer memory are transmitted to the client device upon initialization of the websocket connection. Moreover, the first trigger event may be selected from: a predetermined time or receipt of a query from the client device.

Certain embodiments are directed to a method for multiplexing messages disseminated to client devices within communication channels in association with a group-based communication platform. The method may comprise: maintaining a websocket connection between a client device and a group-based communication platform; transmitting a plurality of messages to the client device via the websocket connection, wherein each of the plurality of messages comprises a correspondence tag identifying a respective communication channel for display of the respective message on the client device within a display window corresponding to the communication channel; and displaying the plurality of messages within respective display windows on the client device based at least on part the correspondence tag.

In certain embodiments, a message of the plurality of messages comprises a plurality of correspondence tags identifying a plurality of communication channels for display of the respective message. Moreover, the method may further comprise: receiving an authentication token from the client device identifying a plurality of communication channels subscribed to by the client device; and transmitting a plurality of messages shared within subscribed communication channels from the one or more message distribution servers to the client device via the websocket connection.

In various embodiments, the method further comprises: receiving a plurality of join request messages from the client device, wherein each join request identifies a communication channel to be joined by the client device; and transmitting a plurality of messages shared within the joined communication channels to the client device via the websocket connection. In certain embodiments, maintaining the websocket connection comprises: initializing the websocket connection in response to a first trigger event to enable transmission of messages to the client device; closing the websocket connection in response to a second trigger event; and storing a plurality of messages in a buffer memory while the websocket connection is closed, such that the plurality of messages stored in the buffer memory are transmitted to the client device upon initialization of the websocket connection. Moreover, the first trigger event may be selected from: a predetermined time or receipt of a query from the client device.

Certain embodiments are directed to a client device for displaying messages exchanged within communication channels associated with a group-based communication platform. In various embodiments, the client device comprises: one or more memory storage areas; and one or more processors collectively configured to: maintain a websocket connection with a group-based communication platform via a communication interface; receive a plurality of messages from the group-based communication platform via the websocket connection, wherein each of the plurality of messages comprise a correspondence tag identifying a respective communication channel for display of the respective message on the client device within a display window corresponding to the communication channel; disseminate the received plurality of messages for display within respective communication windows based at least in part on the correspondence tags associated with the messages.

In various embodiments, disseminating the received plurality of messages comprises: providing each of the plurality of messages to each of the plurality of display windows; and filtering the plurality of messages at each display window based at least in part on the correspondence tags to store and display relevant messages at each respective display window. In certain embodiments, disseminating the received plurality of messages comprises: providing each of the plurality of messages to respective display windows based at least in part on the correspondence tags associated with the messages; and displaying the messages received at each display window. Moreover, maintaining the websocket connection comprises: transmitting a query to the group-based communication platform; and initializing the websocket connection to enable transmission of messages in response to the query.

Various embodiments are directed to a method for displaying messages exchanged within communication channels associated with a group-based communication platform via a client device. In certain embodiments, the method comprises: maintaining a websocket connection with a group-based communication platform via a communication interface; receiving a plurality of messages from the group-based communication platform via the websocket connection, wherein each of the plurality of messages comprise a correspondence tag identifying a respective communication channel for display of the respective message on the client device within a display window corresponding to the communication channel; disseminating the received plurality of messages for display within respective communication windows based at least in part on the correspondence tags associated with the messages.

In various embodiments, disseminating the received plurality of messages comprises: providing each of the plurality of messages to each of the plurality of display windows; and filtering the plurality of messages at each display window based at least in part on the correspondence tags to store and display relevant messages at each respective display window. Moreover, disseminating the received plurality of messages may comprise: providing each of the plurality of messages to respective display windows based at least in part on the correspondence tags associated with the messages; and displaying the messages received at each display window. In certain embodiments, maintaining the websocket connection comprises: transmitting a query to the group-based communication platform; and initializing the websocket connection to enable transmission of messages in response to the query.

BRIEF DESCRIPTION OF THE SEVERAL VIEWS OF THE DRAWINGS

Reference will now be made to the accompanying drawings, which are not necessarily drawn to scale, and wherein:

FIGS. 6-7 are flowcharts illustrating the functionality of various computing entities according to various embodiments.

DETAILED DESCRIPTION

Figure 1:
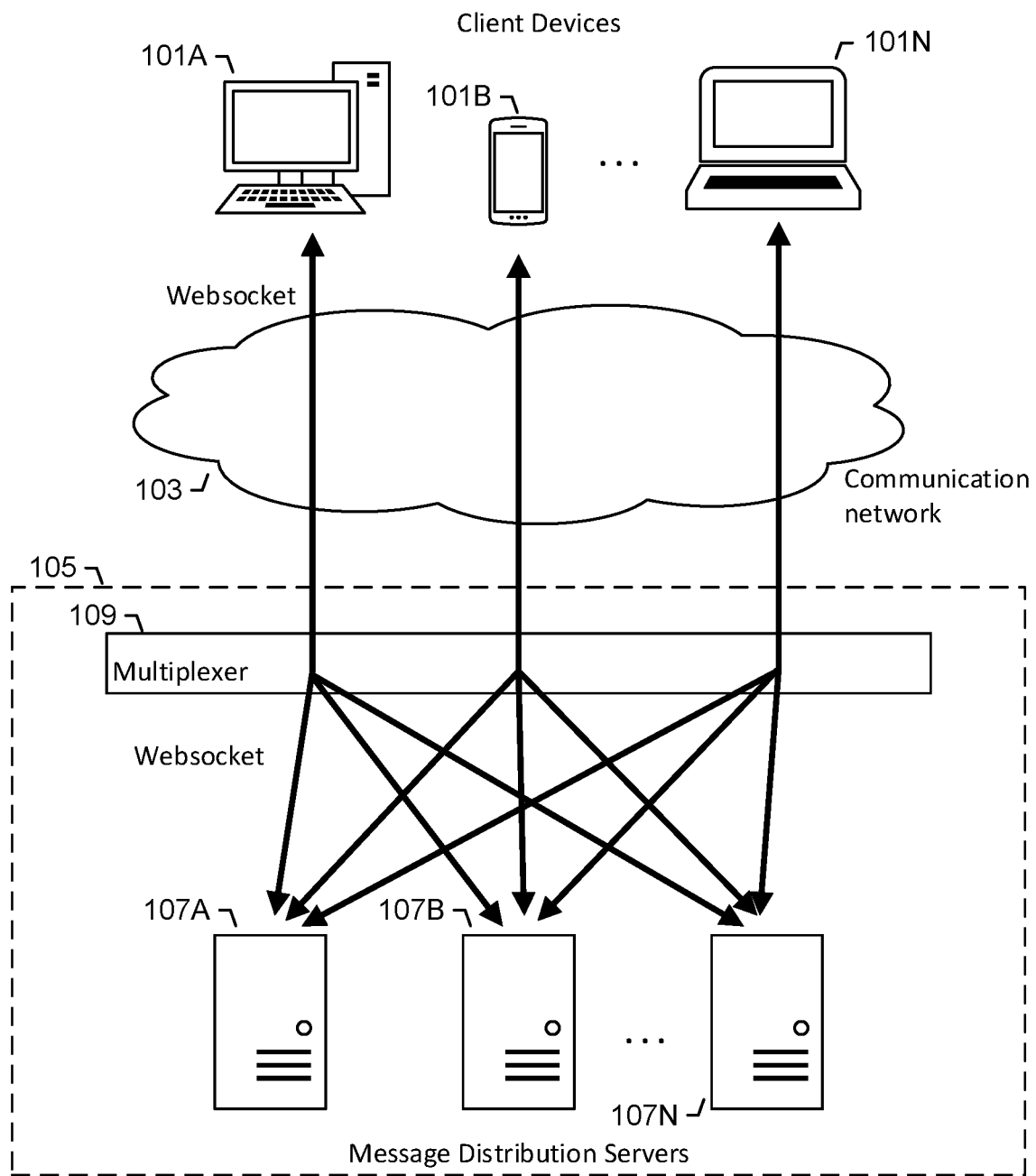
FIG. 1 shows a schematic view of a group-based communication platform in communication with client devices according to one embodiment.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

As individual users of a group-based communication platform initiate and/or join an increasing number of separate correspondence strings (e.g., group-based communication windows each encompassing one or more group-based communication channels, direct message windows, real-time call windows, and/or the like), the processing burdens placed on the messaging server system similarly increases to maintain open lines of communication for each of these correspondence strings. Specifically, each of these correspondence strings may have an associated websocket connection between the messaging server system and each client device, which, in many instances, results in a single client device being connected with the messaging server system via a plurality of discrete websocket connections, each of which requires substantial processing resources to maintain. This generally duplicative communication strategy creates substantial burdens on the client devices (e.g., by requiring relatively high amounts of processing power to maintain the plurality of open websocket connections) and the messaging server system (e.g., by requiring relatively high amounts of processing power to maintain the plurality of open websockets and to restore any websockets that break (e.g., undesirably disconnect) as well as to resend any messages that may have been missed by a client device while the websocket connection is broken).

Various embodiments relate generally to systems and methods for disseminating messages exchanged over communication channels between client devices via a group-based communication system via consolidated websocket connections between individual client devices and servers of the group-based communication system. Each of these consolidated websockets may be utilized to transmit messages, such as text-based messages, real-time audio and/or video-based messages, presence messages (e.g., identifying when another user is active/inactive within a group), and/or the like, that are shared within multiple discrete communication channels (e.g., connecting multi-user teams and/or connecting individual users via one-to-one direct messaging channels) to a particular client device. Those messages may be transmitted together with correspondence tags identifying a group to which each message corresponds, and the receiving client device may parse those messages and respective correspondence tags to display the messages within respective display windows corresponding to the appropriate correspondence group. Thus, all messages destined for a single client device may be transmitted over a consolidated websocket, regardless of whether those messages were shared in a single communication channel or multiple communication channels.

Client devices may subscribe to one or more communication channels, such that the servers of the group-based communication system provide appropriate messages to the client device via the websocket. Those subscriptions may be provided via an Application Programming Interface (API) authentication token identifying the one or more communication channels subscribed to by the client device. Alternatively, the subscriptions may be formed in response to the client device transmitting one or more join-request messages identifying one or more communication channels to join.

Messages shared within a subscribed channel are received at a multiplexer (e.g., in direct communication with the servers of the group-based communication system) and disseminated to appropriate client devices via websocket connections corresponding to each client device. The multiplexer may be in communication with the servers of the group-based communication system via a plurality of websocket connections each utilized for disseminating messages destined for a single client device within a single communication group. However, it should be understood that the multiplexer may receive messages from the servers via any of a variety of communication protocols to compile those messages for dissemination to appropriate client devices. In embodiments that do not utilize websocket connections between the multiplexer and the communication servers, the number of websocket connections utilized for disseminating messages to a particular client device may be significantly lower than the number of channels for which the client device is subscribed.

Moreover, the number of messages transmitted to client devices may be minimized as well. Messages transmitted for display in association with particular communication channels may be transmitted with one or more correspondence tags identifying channels and/or groups for which the message is associated. Thus, if a particular message is associated with a plurality of channels (e.g., a presence message indicating that another member of multiple channels has gone offline), only a single version of this message may be sent to the client device, and the client device may display that message in each of a plurality of corresponding channel display windows.

Moreover, various embodiments provide temporal-based multiplexing for minimizing the number of simultaneously-open websocket connections from a multiplexer. For non-Real-Time Messaging (RTM) messages, a client device may be configured to initialize a websocket connection with the multiplexer in response to the occurrence of a trigger event (e.g., the occurrence of a particular time, which may be established by the client device or based at least in part on messages received from the multiplexer identifying a particular time for establishing a websocket connection). The multiplexer and client device may maintain the websocket as active while the multiplexer transmits messages to the client device, and the client device may then close the websocket connection upon the occurrence of a second trigger event (e.g., upon completion of transmission of messages, identified by data transmitted from the multiplexer indicating that message transmission is complete; upon receipt of a message from the multiplexer indicating an upcoming websocket connection termination). In other embodiments, temporal-based multiplexing may be provided by a client device initiating a websocket connection with the multiplexer periodically, according to a defined schedule. For example, the client device may initialize and maintain a websocket connection with the multiplexer for a defined time period (e.g., one minute), during which time all messages stored in a buffer memory associated with the client device may be transmitted to the client device. The client device may then close the websocket connection for a second defined period of time (e.g., 9 minutes), and the multiplexer may store any messages destined for the client device during the second defined period of time within the buffer memory for transmission during the next period of open websocket based communication.

Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like. Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "user" should be understood to refer to an individual, a group of individuals, business, organization, and the like. Users may access a group-based communication or messaging system using client devices. "Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The terms "user profile," "user account," and "user account details" refer to information associated with a user, including, for example, a user identifier, one or more communication channel identifiers (e.g., group-based communication channel identifiers) associated with communication channels (e.g., group-based communication channels) that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a time zone, a status, and the like. The user account details can include a subset designation of user credentials, such as, for example, login information for the user including the user's username and password.

The term "client device" refers to computer hardware(s) and/or software(s) that is/are configured to access one or more services made available by one or more servers. The server(s) is/are often (but not always) on another computer system, in which case the client device accesses the service by way of a network. A client device may be associated with a group identification, where the group identification is an electronic indication that suggests a group (e.g., user group) that the user belongs to. Client devices may include, without limitation, smart phones, tablet computers, laptop computers, desktop computers, wearable devices, personal computers, enterprise computers, and the like.

The term "group-based communication platform" refers to a collection of computing services that are accessible to one or more client devices, and that are operable to provide access to a plurality of software applications related to operations of databases. In some examples, the group-based communication platform may take the form of one or more central servers disposed in communication with one or more additional servers running software applications, and having access to one or more databases storing digital content items, application-related data, and/or the like.

The term "communication channel" refers to an information route and associated circuitry that is used for data exchange between and among systems and parts of systems. For example, a communication channel may be established between and among various client devices, allowing these client devices to communicate and share data between and among each other. These communication channels may be "group-based communication channels" established between and among a select group of client devices (and their respective users) for sharing messages among all users of the group. The communication channels may also and/or alternatively be one-to-one, direct message communication channels established between and among two client devices (and their respective users) for sharing messages among only those two users.

Multiple communication channels may operate on each of one or more computing devices, and therefore a communication channel identifier may be assigned to a communication channel, which indicates the physical address in a database where related data of that communication channel is stored and which is utilized to identify client devices that participate within the communication channel to receive data exchanged on the communication channel. The communication channel identifier therefore ensures communication channels remain distinct and separate even on computing devices associated with a plurality of communication channels.

A communication channel may be "public," which may allow any client device to join and participate in the information sharing through the communication channel. A communication channel may be "private," which may restrict data communications in the communication channel to certain client devices and/or users.

The term "group-based communication channel interface" refers to a virtual communications environment or feed that is configured to display messaging communications posted by channel members (e.g., validated users accessing the environment using client devices) that are viewable only to the members of the group. The format of the group-based communication channel interface may appear differently to different members of the group-based communication channel; however, the content of the group-based communication channel interface (i.e., messaging communications) will be displayed to each member of the group-based communication channel. For instance, a common set of group-based messaging communications will be displayed to each member of the respective group-based communication channel such that the content of the group-based communication channel interface (i.e., messaging communications) will not vary per member of the group-based communication channel.

In certain embodiments, the group-based communication channel interface may comprise one or more display windows each configured for displaying one or more messages, posts, calls (e.g., audio/video calls, video calls or audio-only calls) provided for exchange via the group-based communication platform. In certain embodiments, the group-based communication channel interface may comprise a main display window (also referred to herein as a parent display window) and a plurality of child display windows. In certain embodiments, the main display window may comprise a plurality of individual display panes (as shown in the parent display window 501 shown in FIG. 5, herein). For example, each display pane may be configured to display specific data types. For example, a left-most pane may provide a listing of channels and/or direct messages available to a user and a right-most (or center pane, in a 3-pane configuration) may display the content of a particular channel in which messages are exchanged, including displaying all of those displayed messages. In embodiments in which the main display window comprises 3-panes, the right-most pane may comprise additional data regarding a particular selected message, channel, and/or the like.

As used herein, the terms "messaging communication" and "message" refer to any electronically generated digital content object provided by a user using a client device and that is configured for display within a group-based communication channel interface. Message communications may include any text, image, video, audio, or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a communication channel (e.g., a group-based communication channel) of the group-based communication system includes metadata comprising the following: a sending user identifier, a message identifier, message contents, and correspondence tags, such as a group identifier and/or a group-based communication channel identifier. Each of the foregoing identifiers may comprise ASCII text, a pointer, a memory address, and the like. Messages may be generated and/or edited within an individual pane of a group-based communication interface (a single pane being visible within a particular display window) and/or messages may be generated and/or edited within separate display windows (e.g., separate display windows may be utilized for generating postings to be shared within a communication channel and/or for initiating a call with other users).

The terms "group identifier" or "team identifier" refer to one or more items of data by which a group within a group-based communication system may be identified. For example, a group identifier may comprise ASCII text, a pointer, a memory address, and the like.

The terms "group-based communication channel identifier" or "channel identifier" refer to one or more items of data by which a group-based communication channel may be identified. For example, a group-based communication channel identifier may comprise ASCII text, a pointer, a memory address, and the like. In certain embodiments, a communication channel (whether public or private) may be available for use between users (and their associated client devices) of a common group/team, although cross-group communication channels may be available between client devices associated with users of separate teams. Thus, a channel identifier may be provided together with one or more group identifiers to specifically identify where data/messages related to the particular communication channel are stored.

As discussed herein, "correspondence tags" may comprise one or more of a group identifier or a channel identifier, and may be transmitted to a client device together with a message. The correspondence tags may thus identify a group and/or a channel in which the message is to be disseminated, thereby enabling a client device to display the message in association with the appropriate group and/or channel. In certain embodiments, the correspondence tag may be embodied as a channel identifier, thereby identifying a channel in which the message is exchanged. In other embodiments, the correspondence tag may be embodied as a group identifier identifying a group in which the message is exchanged. Moreover, the correspondence tags of certain embodiments may comprise both channel identifiers and team identifiers.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more communication channels (e.g., group-based communication channels) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join and/or create communication channels (e.g., group-based communication channels). Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

"Multiplexers" as discussed herein with reference to various embodiments are computing devices (or portions of computing devices) for maintaining communication connections with various client devices. Specifically, multiplexers may be configured for maintaining websocket connections initiated by each of a plurality of client devices for transmitting messages and corresponding metadata (e.g., comprising correspondence tags) in real time between message distribution servers of the group-based communication platform and respective client devices. The multiplexer may thereby interact with client devices as an interface computing entity for directing message data among client devices both within and outside of the group-based communication platform. The multiplexers may be the only interface computing entities for exchanging messages between the group-based communication platform and various client devices (e.g., receiving and transmitting messages to and from the various client devices), or the multiplexers may be one of a plurality of interface computing entities collectively configured for the exchange of messages between the group-based communication platform and various client devices. For example, the multiplexers may be configured for transmitting messages to various client devices, and other interface computing entities may be configured for receiving messages transmitted from the various client devices.

In certain embodiments, the multiplexers generate and maintain backend websocket connections with one or more message distribution servers as discussed herein for obtaining messages to be disseminated to the various client devices. The multiplexer-to-server websockets may be each configured for transmitting data exchanged on a single communication channel and destined for a single user/client device. For example, a first websocket may be generated between the multiplexer and the message distribution servers for transmitting message data exchanged on "Channel 1" communication channel and destined for "User 1." A second websocket may be generated between the multiplexer and the message distribution servers for transmitting message data exchanged on the same "Channel 1" communication channel, but destined for "User 2."

"Message distribution servers" as discussed herein with reference to certain embodiments are computing devices configured for interacting with various client devices (e.g., via a multiplexer) for receiving and/or disseminating messages for distribution within communication channels. Message distribution servers may be configured to receive, store (in an associated database), and/or direct messages exchanged between users (operating via client devices). The functionality of the message distribution servers may be provided via a single server or collection of servers having a common functionality, or the functionality of the message distribution servers may be segmented among a plurality of servers or collections of servers performing subsets of the described functionality of the message distribution servers. For example, a first subset of message distribution servers—gateway servers—may be configured for receiving messages from client devices and/or for transmitting messages to client devices via a multiplexer or other interface controller. These gateway servers may be in communication with a second subset of message distribution servers—channel servers—configured for collecting messages distributed within communication channels and for storing those messages within a message repository database for indexing and archiving. In certain embodiments, the channel servers may be in communication with the multiplexer to provide various messages to client devices.

In certain embodiments, one or more of the multiplexers and/or the message distribution servers may be geographically distributed, for example, to service client devices located geographically proximate the one or more computing entities. However, in certain embodiments the various computing entities (including the multiplexers and/or the message distribution servers) may be centrally-located.

Example System Architecture

Methods, apparatuses, and computer program products of the present invention may be embodied by any of a variety of devices. For example, the method, apparatus, and computer program product of an example embodiment may be embodied by a network device, such as a server or other network entity, configured to communicate with one or more devices, such as one or more client devices. In some preferred and non-limiting embodiments, the computing device may include fixed computing devices, such as a personal computer or a computer workstation. Still further, example embodiments may be embodied by any of a variety of mobile devices, such as a portable digital assistant (PDA), mobile phone, smartphone, laptop computer, tablet computer, wearable device, or any combination of the aforementioned devices.

Figure 2:
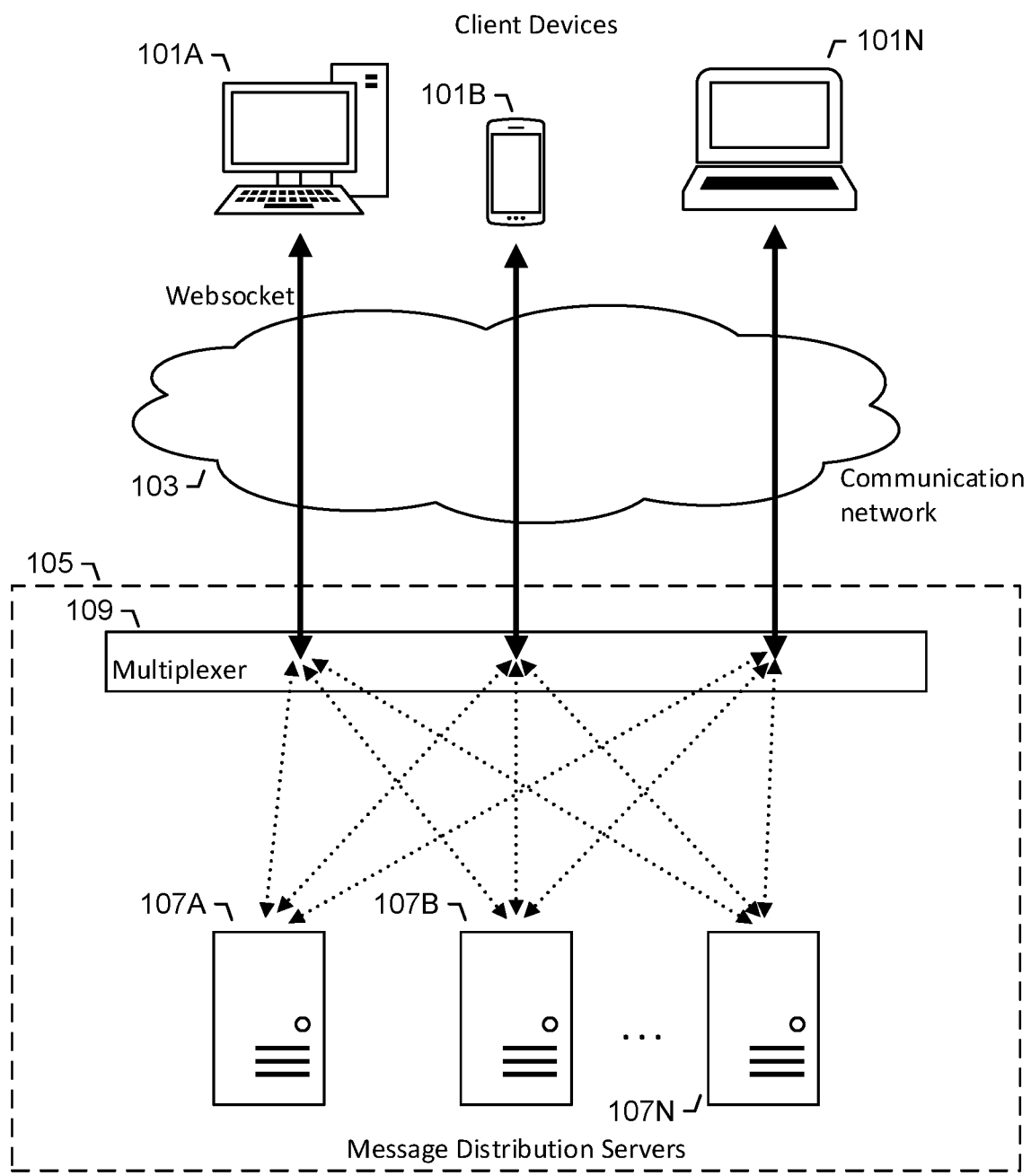
FIG. 2 shows a schematic view of a group-based communication platform in communication with client devices according to another embodiment.

FIGS. 1-2 illustrate example computing systems within which embodiments of the present invention may operate. Users may access a group-based communication platform 105 via a communication network 103 using client devices 101A-101N.

Communication network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 103 may include a cellular telephone, an 802.11, 802.16, 802.20, and/or WiMax network. Further, the communication network 103 may include a public network, such as the Internet, a private network, such as an intranet, or combinations thereof, and may utilize a variety of networking protocols now available or later developed including, but not limited to TCP/IP based networking protocols. As discussed herein, the networking protocol is configured to enable data transmission via websocket communications. For instance, the networking protocol may be customized to suit the needs of the group-based communication system. In some embodiments, the protocol is a custom protocol of JavaScript object notation (JSON) objects sent via a websocket channel. In some embodiments, data may be transmitted via a plurality of protocols, such as JSON over remote procedure call (RPC), JSON over representational state transfer (REST)/HTTP, and the like.

In the illustrated embodiment, the group-based communication platform 105 includes a plurality of message distribution servers 107A-107N accessible via the communication network 103 via a multiplexer 109. Collectively, the message distribution servers 107A-107N are configured for receiving messages transmitted from one or more client devices 101A-101N, storing the messages within database storage areas for individual communication channels, and/or for transmitting messages to appropriate client devices 101A-101N via a multiplexer 109.

Similarly, the multiplexer 109 (or plurality of multiplexers 109) may be embodied as a computer or computers as known in the art. In the illustrated embodiment of FIG. 1, the multiplexer 109 provides for receiving electronic data from various sources, including, but not limited to the client devices 101A-101N (e.g., via websocket communications over the communications network 103) and/or the message distribution servers 107A-107N (e.g., via backend websocket communications, via push/pull data transmissions, and/or the like). Moreover, the multiplexer 109 of the illustrated embodiment is also configured to parse metadata provided as a portion of one or more electronic messages, and to direct incoming electronic messages to one or more message distribution servers 107A-107N based at least in part on the content of the metadata associated with the electronic messages and/or to direct outbound electronic messages to one or more client devices 101A-101N based at least in part on the content of the metadata associated with the electronic messages.

The client devices 101A-101N may be any computing device as defined above. Electronic message data exchanged between the message distribution servers 107A-107N and the client devices 101A-101N via the multiplexer 109 may be provided in various forms and via various methods.

In some preferred and non-limiting embodiments, one or more of the client devices 101A-101N are mobile devices, such as smartphones or tablets. The one or more client devices may execute an "app" to interact with the message distribution servers 107A-107N and/or multiplexer 109. Such apps are typically designed to execute on mobile devices, such as smartphones or tablets. For example, an app may be provided that executes on mobile device operating systems such as Apple Inc.'s iOS®, Google Inc.'s Android®, or Microsoft Inc.'s Windows 10 Mobile®. These platforms typically provide frameworks that allow apps to communicate with one another, and with particular hardware and software components of mobile devices. For example, the mobile operating systems named above each provides frameworks for interacting with location services circuitry, wired and wireless network interfaces, user contacts, and other applications. Communication with hardware and software modules executing outside of the app is typically provided via application programming interfaces (APIs) provided by the mobile device operating system. Thus, via the app executing on the client devices 101A-101N, these client devices 101A-101N are configured for communicating with the group-based communication platform 105 via one or more websockets.

In some preferred and non-limiting embodiments, the client devices 101A-101N may interact with the message distribution servers 107A-107N and/or multiplexer 109 via a web browser. The client devices 101A-101N may also include various hardware or firmware designed to interact with the message distribution servers 107A-107N and/or multiplexer 109. Again, via the browser of the client devices 101A-101N, the client devices 101A-101N are configured for communicating with the group-based communication platform 105 via one or more websockets.

In some embodiments of an exemplary group-based communication platform 105, a message or messaging communication may be sent from a client device 101A-101N to a group-based communication platform 105. In various implementations, messages may be sent to the group-based communication platform 105 over communication network 103 directly by one of the client devices 101A-101N. The messages may be sent to the group-based communication platform 105 via an intermediary such as a message server, and/or the like. For example, a client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/my certfcate.dc</digital_cert_link>
            //OPTIONAL <digital_certificate>_DATA_</digital_certificate>
        </user_account credentials>
    </user_accounts_details>
    <client_details> //iOS Client with App and Webkit
        //it should be noted that although several client details
        //sections are provided to show example variants of client
        //sources, further messages will include only one to save
        //space
        <client_IP> 10.0.0.123 </client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MSM.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
```

```
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP> 10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-
XXXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-
XXXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1</team_identifier>
        <channel identifier>ID_channel_1</channel_identifier>
        <contents>That is an interesting invention. I have attached a copy our patent
policy.</contents>
        <attachments>patent_policy.pdf</attachments>
    </message>
</auth_request>
```

In the illustrated embodiment, the group-based communication platform 105 comprises a plurality of message distribution servers 107A-107N configured to receive messages transmitted between a plurality of client devices 101A-101N within a channel identified by a channel identifier and/or a group identifier, and to facilitate dissemination of those messages among client devices 101A-101N that collectively form the membership of the communication channel.

In some embodiments, a correspondence tag, such as a group identifier, team identifier, and/or channel identifier as defined above may be associated with the message. In some embodiments, the correspondence tag may comprise or be embodied as a group-based communication channel identifier as defined above that may be associated with the message. In yet other embodiments, the correspondence tag may comprise or be embodied as a group-identifier as defined above that may be associated with the message.

In some embodiments, the correspondence tag may comprise or be embodied as a sending user identifier as defined above that may be associated with the message. Moreover, the correspondence tag may comprise a plurality of identifiers in certain embodiments, such as any combination of a group identifier a channel identifier and/or a sending user identifier. In one implementation, the message may be parsed (e.g., using hypertext preprocessor (PHP) commands) to determine a sending user identifier of the user who sent the message.

In some embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel interface in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

SELECT messageResponses
FROM MSM_Message
WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) and/or to facilitate various facets of searching (i.e., search queries that return results from the message distribution servers 107). Metadata associated with the message may be determined and the message may be indexed in the message distribution servers 107A-107N. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes). If there are attachments associated with the message, file contents of the associated files may be used to index such files in the message distribution servers 107A-107N to facilitate searching. In one embodiment, the files may be indexed such that a company's or a group's files are indexed at a separate distributed repository.

Examples of electronic information exchange among one or more client devices 101A-101N and the group-based communication platform 105 are described below with reference to FIGS. 1-2.

As shown in FIGS. 1-2, the group-based communication platform 105 enables individual client devices 101A-101N to exchange various messages with one another. To exchange such messages, individual client devices 101A-101N transmit messages (e.g., text-based messages, files, video and/or audio streams, and/or the like) to an interface (e.g., multiplexer 109) via a communication protocol (e.g., via a websocket, a non-RTM messaging protocol, and/or the like). Those messages are ultimately provided to one or more message distribution servers 107A-107N, which indexes the messages and distributes those messages to the intended recipients (e.g., client devices 101A-101N) of the message. The distributed messages are provided to the recipient client devices 101A-101N via the multiplexer, which maintains single websocket connections with individual recipient client devices 101A-101N of the message, and maintains one or more communication connections with the various message distribution servers 107A-107N (e.g., websocket connections, as shown in FIG. 1, or non-websocket connections, as shown in FIG. 2).

According to embodiments of FIGS. 1-2, the client devices 101A-101N are configured to display the received message in contextually-relevant user interfaces available to the user of the client device 101A-101N. For example, messages transmitted from a first client device 101 as a part of a group-based communication channel are displayed in a user interface display window on client devices 101A-101N associated with other members of the group-based communication channel. As discussed herein, the messages are transmitted with correspondence tags usable by the recipient client devices 101A-101N to display those messages within appropriate user display elements. Those correspondence tags may comprise team identifiers, group identifiers, and/or channel identifiers usable by a client device to direct those messages to appropriate display windows. Moreover, the correspondence tags may be usable by various ones of the message distribution servers 107A-107N to direct those messages to appropriate recipient client devices 101A-101N and/or to index and store those messages within appropriate database instances. To distribute those messages to individual client devices 101A-101N, the messages are transmitted from the message distribution servers 107A-107N to the multiplexer 109, which compiles all messages destined for respective ones of the client devices 101A-101N, and transmits all of those messages to the client devices 101A-101N over a common websocket connection (each client device 101A-101N being connected with the multiplexer over a respective websocket connection), regardless of the communication channel in which the message is exchanged. However, it should be understood that in certain embodiments, a plurality of websocket connections may be utilized for transmitting data to the client device. For example, a first websocket connection may be utilized for transmitting compiled messages (e.g., messages exchanged within a plurality of communication channels) to the client device, and a second websocket connection may be utilized for transmitting other data types (e.g., particular documents shared among a plurality of client devices, and/or the like).

Once the messages are received at the client devices 101A-101N, software instances executing on the individual client devices 101A-101N direct the messages to contextually appropriate display windows corresponding to the communication channels in which the messages are exchanged. For example, the client devices 101A-101N may be configured to share all messages with all display windows, and each of those display windows may operate with respective correspondence identifiers to filter and display only those messages that are contextually relevant to the communication channel displayed within the respective display window. For example, each display window may have associated correspondence identifiers identifying the communication channel corresponding to the display window. As messages are received at each display window instance, the client device 101 compares the correspondence tags of the individual messages against the correspondence identifiers for the particular display window to filter all those messages not relating to correspondence identifier of the particular display window. The messages may further comprise additional metadata, such as sending user identifiers, time stamps, and/or the like to enable the client device 101 to display messages in an appropriate order (e.g., the order in which they are received) and/or with other data that may be utilized to provide context for the messages.

In other embodiments, all messages transmitted to a particular client device 101 are received via a single display window (discussed herein as a main window or a parent window, used interchangeably), which is configured to parse the messages received by the client device 101 and to provide those messages to contextually relevant display windows (discussed herein as child windows). Thus, individual display windows only receive messages that are contextually relevant for the particular display window.

Example Apparatuses Utilized with Various Embodiments

Figure 3:
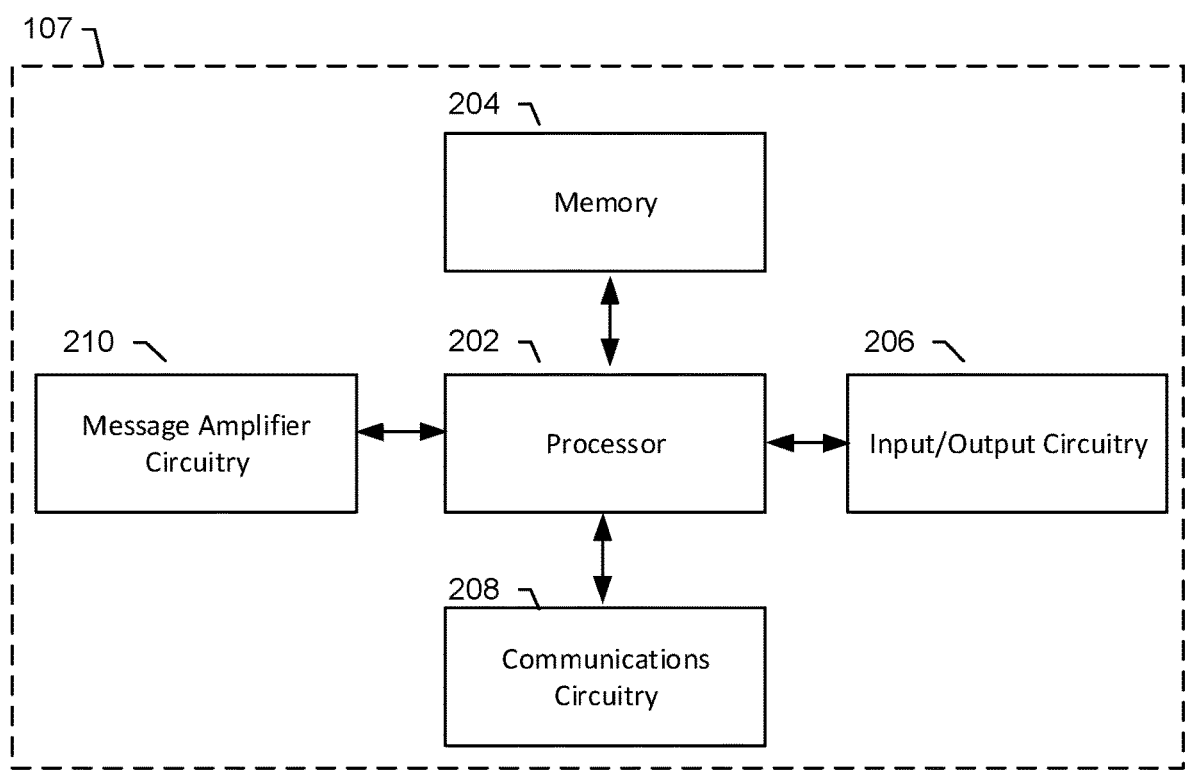
FIG. 3 shows a schematic view of a message distribution server according to one embodiment.

Each message distribution server 107 may be embodied by one or more computing systems, such as apparatus 200 shown in FIG. 3. The apparatus 200 may include processor 202, memory 204, input/output circuitry 206, communications circuitry 208, and message amplifier circuitry 210. The apparatus 200 may be configured to execute the operations described herein with respect to FIGS. 1-7. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

As just one example, the processor 202 may be configured to maintain one or more communication channels connecting a plurality of client devices 101A-101N to enable message sharing therebetween. The processor 202 ensures that messages intended for exchange between the client devices 101A-101N within the particular communication channel are properly disseminated to those client devices 101A-101N for display within respective display windows provided via the client devices 101A-101N.

Moreover, the processor 202 may be configured to synchronize messages exchanged on a particular communication channel with a database for storage and/or indexing of messages therein. In certain embodiments, the processor 202 may provide stored and/or indexed messages to the multiplexer 109 for dissemination to client devices 101A-101N.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

Message amplifier circuitry 210 includes hardware configured to copy and amplify electronic messages and associated metadata received from one or more client devices 101A-101N to other client devices 101A-101N based on database shard(s). The message amplifier circuitry 210 may utilize processing circuitry, such as the processor 202, to perform these actions. However, it should also be appreciated that, in some embodiments, the message amplifier circuitry 210 may include a separate processor, specially configured Field Programmable Gate Array (FPGA), or Application Specific Integrated Circuit (ASIC) for performing the functions described herein. The message amplifier circuitry 210 may be implemented using hardware components of the apparatus configured by either hardware or software for implementing these planned functions.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Figure 4:
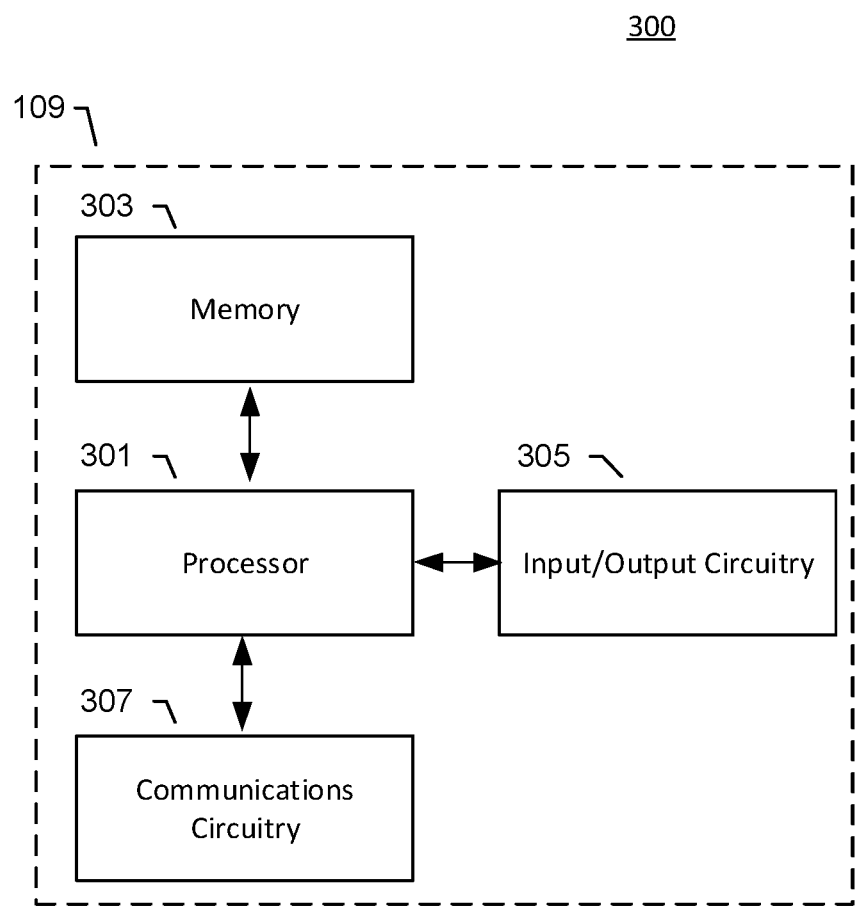
FIG. 4 shows a schematic view of a multiplexer according to one embodiment.

In the illustrated embodiment of FIG. 4, the multiplexer 109 is embodied by one or more computing systems encompassing apparatus 300. The illustrated apparatus 300 includes processor 301, memory 303, input/output circuitry 305, and communications circuitry 307. The apparatus 300 may be configured to execute the operations described herein with respect to FIGS. 1-7. Although these components 301-307 are described with respect to functional limitations, it should be understood that the particular implementations necessarily include the use of particular hardware. It should also be understood that certain of these components 301-307 may include similar or common hardware. For example, two sets of circuitries may both leverage use of the same processor, network interface, storage medium, or the like to perform their associated functions, such that duplicate hardware is not required for each set of circuitries.

In some embodiments, the processor 301 (and/or co-processor or any other processing circuitry assisting or otherwise associated with the processor) may be in communication with the memory 303 via a bus for passing information among components of the apparatus. The memory 303 is non-transitory and may include, for example, one or more volatile and/or non-volatile memories. In other words, for example, the memory 303 may be an electronic storage device (e.g., a computer-readable storage medium). The memory 303 may be configured to store information, data, content, applications, instructions, or the like for enabling the apparatus 300 to carry out various functions in accordance with example embodiments of the present invention. For example, the memory 303 may be configured to cache messages exchanged on one or more group-based communication channels, such that the processor 301 may provide various messages to client devices (e.g., on an as needed or as requested basis).

The processor 301 may be embodied in a number of different ways and may, for example, include one or more processing devices configured to perform independently. In some preferred and non-limiting embodiments, the processor 301 may include one or more processors configured in tandem via a bus to enable independent execution of instructions, pipelining, and/or multithreading.

In some preferred and non-limiting embodiments, the processor 301 may be configured to execute instructions stored in the memory 303 or otherwise accessible to the processor 301. In some preferred and non-limiting embodiments, the processor 301 may be configured to execute hard-coded functionalities. As such, whether configured by hardware or software methods, or by a combination thereof, the processor 301 may represent an entity (e.g., physically embodied in circuitry) capable of performing operations according to an embodiment of the present invention while configured accordingly. Alternatively, as another example, when the processor 301 is embodied as an executor of software instructions, the instructions may specifically configure the processor 301 to perform the algorithms and/or operations described herein when the instructions are executed.

In some embodiments, the apparatus 300 may include input/output circuitry 305 that may, in turn, be in communication with processor 301 to provide output to the user and, in some embodiments, to receive an indication of a user input. The input/output circuitry 305 may comprise a user interface and may include a display, and may comprise a web user interface, a mobile application, a client device, a kiosk, or the like. In some embodiments, the input/output circuitry 305 may also include a keyboard, a mouse, a joystick, a touch screen, touch areas, soft keys, a microphone, a speaker, or other input/output mechanisms.

The communications circuitry 307 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 307 may include, for example, a network interface for enabling communications with a wired or wireless communication network. For example, the communications circuitry 307 may include one or more network interface cards, antennae, buses, switches, routers, modems, and supporting hardware and/or software, or any other device suitable for enabling communications via a network. Additionally or alternatively, the communications circuitry 307 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Moreover, although the multiplexer 109 is shown within the bounds of the group-based communication platform 105, it should be understood that the multiplexer 109 may be embodied as an edge-based computing device in communication with aspects of the group-based communication platform 105 via a communication network 103. Such embodiments may comprise a plurality of multiplexers 109 that are geographically distributed, and such multiplexers 109 may be configured for communicating with client devices 101A-101N within a geographic range proximate a respective multiplexer 109.

The term "circuitry" should be understood broadly to include hardware and, in some embodiments, software for configuring the hardware. With respect to components of each apparatus 200, 300, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like. Similarly, other elements of the apparatus 300 may provide or supplement the functionality of particular circuitry. For example, the processor 301 may provide processing functionality, the memory 303 may provide storage functionality, the communications circuitry 307 may provide network interface functionality, and the like.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Moreover, although not shown, various embodiments of a group-based communication platform may comprise one or more databases configured for storing and/or indexing messages exchanged within various group-based communication channels.

Example Data Flows

FIGS. 6-7 are flowcharts illustrating the functionality of the group-based communication platform 105 (specifically with reference to the functionality of the multiplexer 109) and individual client devices 101A-101N, respectively. As mentioned herein, various embodiments enable the group-based communication platform 105 to provide a plurality of messages to individual client devices 101A-101N via single websocket connections (a single websocket connection per client device 101), regardless of the communication channel in which the messages are exchanged. Upon receipt of the messages, the client devices 101A-101N ascertain contextual information relating to each individual message such that those messages are displayed in appropriate display windows corresponding to the communication channel in which the messages are exchanged.

Multiplexer Operation

Beginning with a discussion of FIG. 6, which illustrates various functionalities of the multiplexer 109 of the group-based communication platform 105, various embodiments are configured to begin message distribution functionalities by maintaining a websocket connection established between the multiplexer 109 and individual client devices 101A-101N, as shown at Block 601.

The websocket connection may enable real-time transmission of messages from the multiplexer 109 to the individual client device 101 (and in certain embodiments, the websocket connection may be configured to enable the client device 101 to transmit messages to the multiplexer 109 over the same connection). From the perspective of the multiplexer 109, each websocket connection is associated with a respective client device 101, and accordingly the multiplexer 109 may be configured to store data indicative of the identity of the client device 101 associated with each individual websocket connection. FIGS. 1-2 schematically illustrate the functionality of the multiplexer 109 in transmitting messages via a backend websocket connection (illustrated as thick-lined arrows) to client devices 101A-101N via the communication network 103.

The multiplexer 109 may be configured to maintain a websocket connection established with a client device 101 each time the client device 101 logs-in or otherwise becomes available for message exchange with the group-based communication platform 105 (e.g., upon opening an app on the client device 101 associated with the group-based communication platform 105). As discussed herein, the group-based communication platform 105 is configured to store messages destined for a particular client device 101 while the client device 101 is disconnected from the group-based communication platform 105 until the client device 101 becomes available to receive messages. Accordingly, the multiplexer 109 may be configured to monitor the status of individual client devices 101A-101N and their associated websocket connections to ascertain when and/or whether particular client devices 101A-101N are available to receive messages. The multiplexer 109 may be configured to provide such status information/data to other components of the group-based communication platform 105, such as message distribution servers 107A-107N. Indeed, message distribution servers 107A-107N may be configured to disseminate status messages to client devices 101A-101N based on user (client device) status data generated by the multiplexer 109 or other interface aspect of the group-based communication platform 105. As discussed herein, the message distribution servers 107A-107N may be configured to store messages exchanged within individual communication channels and accordingly the message distribution servers 107A-107N may be configured to provide messages to be disseminated to individual client devices 101A-101N to the multiplexer 109 only during time periods in which the individual client devices 101A-101N are available to receive such messages.

Upon initialization of the websocket connection with the client device 101, the multiplexer 109 may be configured to attribute particular communication channel memberships with the client device 101 to enable transmission of messages exchanged within the particular correspondence channels to the client device 101. As discussed herein, the client device 101 may provide an authentication token request to the multiplexer 109 identifying a plurality of communication channels to be attributed to the client device 101. In such embodiments, the multiplexer 109 may generate an authentication token in response, identifying all those communication channels to be attributed to the client device 101, thereby enabling transmission of messages exchanged within those communication channels to the client device 101.

In other embodiments, client devices 101A-101N may be configured to transmit a plurality of join request messages to the multiplexer 109, each join request message corresponding to a respective requested communication channel membership. In such embodiments, the multiplexer 109 may be configured to provide individual authentication tokens in response to the plurality of join requests, thereby enabling transmission of messages exchanged within the joined memberships to the client device 101.

During instances in which a client device 101 is available to receive messages, the multiplexer 109 receives messages for the client device 101 from the message distribution servers 107A-107N as shown at Block 602. The multiplexer 109 may be configured to receive messages from the message distribution servers 107A-107N via any of a variety of message transmission protocols. For example, the message distribution servers 107A-107N may be configured to establish one or more backend websocket connections with the multiplexer 109 as shown in the schematic illustration of FIG. 1. In such embodiments, the message distribution servers 107A-107N establish a single websocket connection with the multiplexer 109 for each client device-specific membership in various communication channels. As a specific example, if a particular user (client device 101) is a member of 3 different communication channels, such that the client device 101 receives messages exchanged in each of those 3 communication channels, the message distribution servers 107A-107N establish 3 backend websocket connections with the multiplexer 109 corresponding to that single client device 101. In such embodiments, the number of websocket connections utilized for disseminating messages to an individual client device 101 is equal to one more than the total number of communication channel memberships for the client device 101 (a single websocket connection between the multiplexer 109 and the client device 101, and a single backend websocket connection corresponding to each communication channel membership is established between the multiplexer 109 and the message distribution servers 107A-107N).

In other embodiments, only a single websocket connection is utilized for each client device 101 for disseminating messages, as shown schematically in FIG. 2. The websocket connection is established between the multiplexer 109 and the client device 101 (as discussed in reference to Block 601 of FIG. 6), and the multiplexer 109 receives messages from the message distribution servers 107A-107N via other communication protocols that enable RTM message transmissions or non-RTM message transmissions.

In either embodiment, the group-based communication platform 105 may be configured to store a rolling buffer of messages destined for transmission to the client device 101. For example, the most recent 5-minutes, most recent 50 messages, and/or the like may be stored in a buffer corresponding to a particular websocket connection (e.g., a particular backend websocket connection). The rolling-buffer may be utilized to quickly, and with minimal bandwidth, update messages destined for transmission to the client device 101 in instances in which a websocket disconnects and reconnects prior to the expiration of the rolling buffer. In embodiments in which a single websocket connection is utilized for message transmissions to the client device 101, the multiplexer 109 (and/or an associated database) may store a single rolling buffer for each connected client device 101. In embodiments in which the number of websocket connections is equal to one more than the total number of correspondence memberships for each client device 101 (e.g., including backend websocket connections and websocket connections with the client device 101), the message distribution servers 107A-107N may be configured to store rolling-buffers for each websocket connection with the multiplexer 109. The multiplexer 109 may additionally be configured to store another rolling-buffer corresponding to the websocket connection with the client device 101. Accordingly, those embodiments utilizing only a single websocket connection for transmission of messages to client devices 101 utilizes a significantly smaller amount of storage for rolling-buffers than embodiments utilizing a plurality of websocket connections for message distribution to individual client devices 101A-101N.

With reference again to FIG. 6, upon receipt of messages destined for distribution to an individual client device 101, the multiplexer 109 receives messages destined for a single client device 101 with corresponding correspondence tags identifying the communication channel associated with the individual message, as shown at Block 603. In certain embodiments, the messages may be transmitted from the message distribution servers 107A-107N in association with the correspondence tags, or the multiplexer 109 may be configured to generate the correspondence tags based on characteristics of how the messages are provided to the multiplexer 109. For example, the multiplexer 109 may be configured to generate the correspondence tags based at least in part on the identity of a particular backend websocket utilized to transmit the message from the message distribution servers 107A-107N to the multiplexer 109.

The multiplexer 109 may be configured to relay messages to respective client devices 101A-101N in real-time, upon receipt of those messages from the message distribution servers 107A-107N. Accordingly, upon receipt of individual messages, the multiplexer 109 is configured to transmit those messages to respective client devices 101A-101N via respective websocket connections, as indicated at Block 604.

In other embodiments, the multiplexer 109 may be configured for periodic message transmission to individual client devices 101A-101N, such that messages are not transmitted in real-time. For example, messages may be transmitted from the multiplexer 109 in response to the occurrence of a trigger event and/or at defined time intervals. In such embodiments, the multiplexer 109 may be configured to maintain the websocket connection with client devices 101A-101N only periodically, such that the websocket connection is only open with a client device 101 while messages are being transmitted to the client device 101.

As a specific example, a client device 101 may initiate a websocket connection with the multiplexer 109 in response to detection of a trigger event (e.g., an elapsed time, a user input and/or the like, such that the multiplexer 109 transmits messages to the client device 101 while the websocket connection remains open. As yet another example, the client device 101 may be configured to initiate and maintain an open websocket connection with the multiplexer 109 for established time periods, according to a defined schedule. Specifically, the client device 101 may be configured to maintain a websocket connection open with the multiplexer 109 for a single, continuous minute (or another time period), and then to close the websocket connection and to maintain the closed websocket for a continuous 9 minute period (or another time period) before reopening the websocket connection. Thus, the client device 101 may be configured to maintain the websocket connection as open for a small percentage of total time (e.g., 10% of time). In such embodiments, the multiplexer 109 may be configured to transmit messages in real-time while the websocket connection remains open, and to store messages received during the period of time that the websocket connection remains closed, and to transmit the messages upon reinitialization of the websocket connection with the client device.

With reference to the message transmission processes represented by Block 604, various messages transmitted by the multiplexer 109 may be destined for display within a plurality of display windows once received by a client device 101. The multiplexer 109 may thus be configured for transmitting such messages with a plurality of correspondence tags to enable those messages to be displayed within a plurality of display windows once received by a client device 101 (e.g., each of the plurality of display windows being associated with a particular communication channel identified by the correspondence tags transmitted with the message). Accordingly, because these messages are transmitted over a single websocket connection and then disseminated to appropriate display windows, the total number of messages transmitted to the client device 101 from the group-based communication platform 105 may be minimized. Whereas duplicate messages may be transmitted to the client device 101 in instances in which each communication channel membership is supported by a single, corresponding websocket, a single message may be transmitted to the client device 101 and then disseminated to a plurality of display windows once received at the client device 101.

Client Device Operation

FIG. 7 provides a flowchart illustration of various steps performed by the client device 101 for displaying messages that have been received via the websocket connection with the multiplexer 109. Block 701 illustrates the client device's processes for initializing the websocket connection with the multiplexer 109. As discussed herein, the client device 101 may be configured to initialize the websocket connection with the multiplexer 109 upon initialization of the client device 101 (e.g., initialization of an app associated with the group-based communication platform 105). In other embodiments, the client device 101 may be configured to initialize a websocket connection with the multiplexer 109 according to a defined schedule (e.g., such that the websocket connection is open for a portion of the time (e.g., 10%) while the client device 101 is active with the group-based communication platform 105).

Moreover, as mentioned above, each client device 101 may have a single associated websocket connection with the multiplexer 109. In other embodiments, the client device 101 may be configured to initialize and maintain a plurality of websocket connections with the multiplexer 109 (or a plurality of multiplexers), however the total number of websocket connections that the client device 101 maintains simultaneously may be smaller than the total number of communication channel memberships maintained by the client device 101. In other words, each websocket connection maintained by the client device 101 may be configured for transmitting messages exchanged within a plurality of communication channels and/or between members of a plurality of communication groups.

As a part of the initialization process for individual websockets, the client device 101 may be configured to provide data to the multiplexer 109 indicating which communication channel memberships should be utilized for transmission of messages to the client device 101. In certain embodiments, the client device 101 may be configured to generate and transmit an authentication token request to the multiplexer 109 (e.g., via the websocket connection), wherein the authentication token request identifies each of the communication channel memberships to be attributed to the client device 101. The authentication token may be transmitted as a single message or a plurality of messages. As discussed herein, the multiplexer 109 may, in response to the authentication token request, generate a corresponding authentication token to identify those communication channel memberships associated with the client device 101, such that appropriate messages corresponding to each of the communication channel memberships are provided to the client device 101.

As yet another example, upon initialization of the websocket connection between the client device 101 and the multiplexer 109, the client device 101 may generate and transmit a plurality of join requests each corresponding to a particular communication channel to request that messages exchanged within the communication channel are transmitted to the requesting client device 101.

With reference again to FIG. 7, the client device 101 receives messages transmitted via the websocket connection from the multiplexer 109, as indicated at Block 702. Each message has associated correspondence tags identifying communication channels and/or groups in which the message is exchanged. For example, a particular message may be transmitted with a correspondence tag indicating that the message was shared within a direct message channel between the user associated with the client device 101 and a single other user. As yet another example, a presence message (indicating that a particular user has connected or disconnected from the group-based communication platform 105) may be transmitted with correspondence tags indicating that the message should be displayed within all communication channels (e.g., group-based communication channels and/or direct message communication channels) in which the user is active. The presence message may thus be transmitted with a plurality of correspondence tags in instances in which the user is active within a plurality of communication channels, and therefore client devices 101A-101N receiving the presence message may be configured to display the presence message within a plurality of display windows, as indicated by a plurality of correspondence tags transmitted with the message. As yet another example, the correspondence tags associated with a message may indicate that the message should be disseminated within a plurality of channels corresponding to a particular group.

To ensure messages are displayed in appropriate display windows at the client device 101, the client device 101 disseminates received messages to a plurality of display windows (e.g., including the main/parent window and/or a plurality of child windows), as indicated at Block 603. In certain embodiments, all display windows operable via the client device 101 receive or otherwise have access to all messages transmitted to the client device 101. However, each display window operates with an associated display filter based on associated correspondence identifiers such that only messages shared within the communication channel represented within the display window are displayed therein. According to these embodiments, each display window is configured to remain continuously updated as to the connection status of the client device 101 with the multiplexer 109 (e.g., such that each display window is configured to display data indicating the connection status of the client device 101) based at least in part on messages received via the websocket connection. Moreover, messages to be displayed within a particular display window are displayed in accordance with additional metadata transmitted with the message, such that messages are displayed with data indicative of the user transmitting a particular message, as well as data illustrating whether the message is a stand-alone message or is provided in response to another message already displayed within the display window.

Figure 5:
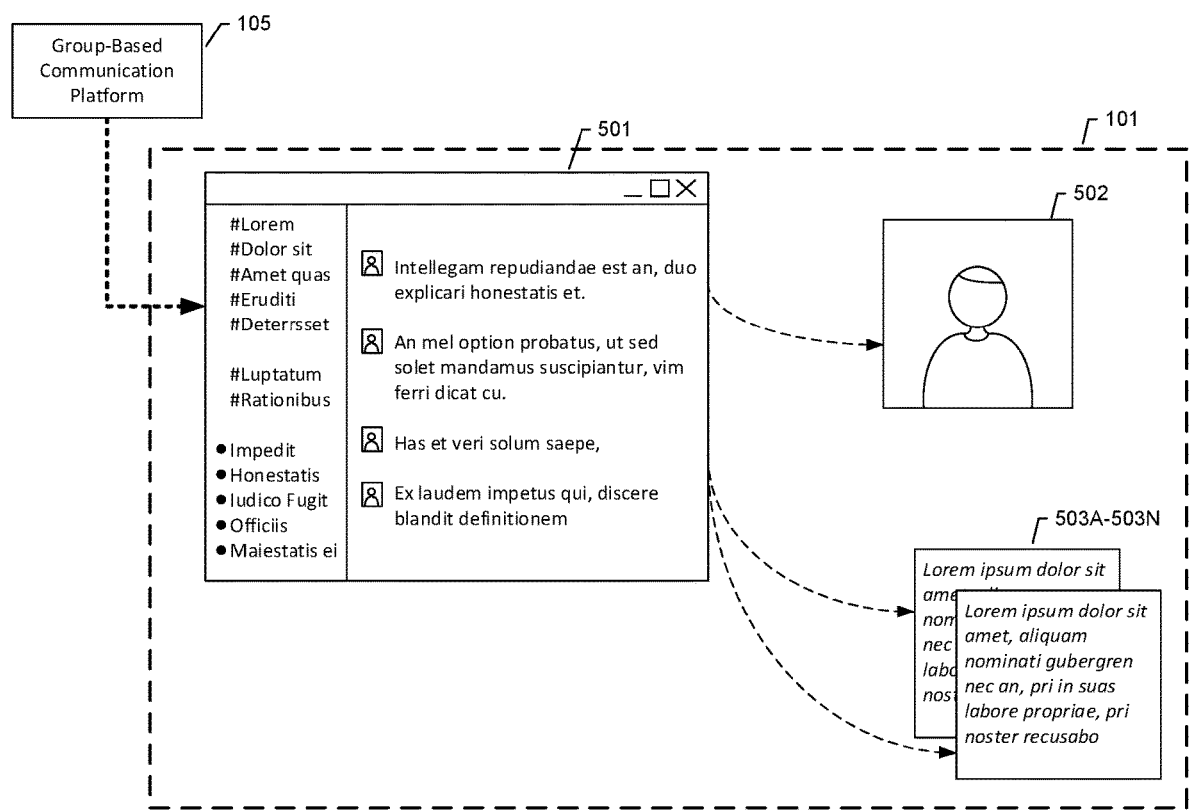
FIG. 5 shows a schematic view of data transmission interactions between display windows of a group-based communication interface, according to one embodiment.

In other embodiments, the client device 101 may operate with a parent display window 501 and a plurality of child display windows 502-503N, as represented by FIG. 5. Messages transmitted via the websocket connection with the multiplexer 109 may be initially received at the parent display window 501 and the parent display window 501 may be configured to disseminate messages to child display windows 502-503N as necessary. Thus, the parent display window 501 may be configured to execute one or more message distribution algorithms (e.g., in real time) as messages are received at the parent display window 501. In certain embodiments, the parent display window 501 is configured to parse messages received by the client device 101 to ascertain the appropriate display window for each message. The parent display window 501 thereafter provides those messages to respective display windows for display (or displays those messages within a pane of the parent display window, as appropriate). As shown in the example of FIG. 5, the parent display window 501 provides messages exchanged as a part of a video discussion to a first child display window 502, and provides additional message data (e.g., post-based message data) to one or more text-based messaging windows 503A-503N.

In the latter embodiment, each child display window 502-503N does not have direct messaging communication with the group-based communication platform 105 via the websocket connection, and therefore the child display windows 502-503N only receive connection status data from the parent display window 501. Thus, the parent display window 501 may be configured to periodically generate and provide connection status data to each of the child display windows 502-503N, indicative of the current status of the connection between the client device 101 and the multiplexer 109. The parent display window thereby virtually duplicates status messages indicative of the websocket connection status that are otherwise directly provided to the parent display window.

Moreover, for messages destined for display in a plurality of child display windows 502-503N (and/or destined for display via the parent display window 501 and at least one child display window 502-503N), the parent display window 501 may be configured to provide these messages to all of the appropriate display windows for display therein.

With reference again to FIG. 7, the client device 101 is configured to display the received messages within respective display windows (and within appropriate display panes of those display windows, if applicable), as indicated at Block 704. The messages may be displayed with relevant contextual information, such as the author/transmitting user that provides the message, whether the message is a reply to an existing message (reply messages may be displayed as visually nested below and/or indented relative to other messages), timestamp data indicating when the message was transmitted, and/or the like.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A message distribution system for communicating messages to client devices in association with a communication platform, the system comprising:
one or more message distribution servers configured for:
storing messages shared within group-based communication system channels, forming groups of users within a buffer of a memory storage device; and
at least one multiplexer configured for temporal-based multiplexing by:
periodically initializing a websocket connection with a client device of a plurality of client devices for a time period having a predefined duration in accordance with a defined schedule, wherein the websocket connection is configured for message exchange between the client device and the at least one multiplexer; and
transmitting a plurality of messages shared within respective group-based communication system channels from the one or more message distribution servers and stored within the buffer to the client device via the websocket connection.

2. The message distribution system of claim 1, wherein periodically initializing the websocket connection comprises:
initializing the websocket connection in accordance with the defined schedule; and
closing the websocket connection upon elapsing of an established time duration.

3. The message distribution system of claim 1, wherein the defined schedule comprises:
a websocket open period identified as the time period having an established time duration during which the websocket connection is initialized, and
a websocket close period during which the websocket connection is closed; and
wherein the one or more message distribution servers are configured to store messages shared within the group-based communication system channels within the buffer of the memory storage device during the websocket close period.

4. The message distribution system of claim 3, wherein the one or more message distribution servers are configured to, in association with the at least one multiplexer, transmit messages shared within the group-based communication system channels to the client device via the websocket connection during the websocket open period.

5. The message distribution system of claim 3, wherein the at least one multiplexer is configured to transmit messages shared within the group-based communication system channels during the websocket open period to the client device in realtime.

6. The message distribution system of claim 1, wherein the predefined duration is defined by a duration of time during which messages are being transmitted to the client device.

7. The message distribution system of claim 1, wherein the at least one multiplexer is further configured to maintain a plurality of backend websocket connections with the one or more message distribution servers, wherein each of the plurality of backend websocket connections corresponds to a group-based communication system channel.

8. The message distribution system of claim 1, wherein each of the plurality of messages comprises a correspondence tag identifying a respective group-based communication system channel for display of the respective message on the client device within a respective display window corresponding to the group-based communication system channel, wherein each display window is displayed within a group-based communication system channel interface displayed via a display device of the client device.

9. A method for multiplexing messages communicated to client devices within group-based communication system channels in association with a communication platform, the method comprising:

storing messages shared within the group-based communication system channels, forming groups of users within a buffer of a memory storage device;

periodically initializing a websocket connection with a client device for a time period having a predefined duration in accordance with a defined schedule, wherein the websocket connection is configured for message exchange between the client device and a multiplexer; and transmitting a plurality of messages shared within respective group-based communication system channels and stored within the buffer to the client device via the websocket connection.

10. The method of claim 9, wherein periodically initializing the websocket connection comprises:

initializing the websocket connection in accordance with the defined schedule; and closing the websocket connection upon elapsing of an established time duration.

11. The method of claim 9, wherein the defined schedule comprises:

a websocket open period identified as the time period having an established time duration during which the websocket connection is initialized, and a websocket close period during which the websocket connection is closed; and wherein the method comprises storing messages shared within the group-based communication system channels within the buffer of the memory storage device during the websocket close period.

12. The method of claim 11, further comprising transmit messages shared within the group-based communication system channels to the client device via the websocket connection during the websocket open period.

13. The method of claim 11, further comprising transmitting messages shared within the group-based communication system channels during the websocket open period to the client device in realtime.

14. The method of claim 9, wherein the predefined duration is defined by a duration of time during which messages are being transmitted to the client device.

15. The method of claim 9, further comprising maintaining a plurality of backend websocket connections with one or more message distribution servers, wherein each of the plurality of backend websocket connections corresponds to a group-based communication system channel.

16. The method of claim 9, wherein each of the plurality of messages comprises a correspondence tag identifying a respective group-based communication system channel for display of the respective message on the client device within a respective display window corresponding to the group-based communication system channel, wherein each display window is displayed within a group-based communication system channel interface displayed via a display device of the client device.

17. A computer program product for communicating messages to client devices in association with a communication platform, the computer program product comprising at least one non-transitory computer-readable storage medium having computer-readable program code portions stored therein, the computer-readable program code portions comprising an executable portion configured to:

store messages shared within group-based communication system channels, forming groups of users within a buffer of a memory storage device;

periodically initialize a websocket connection with a client device for a time period having a predefined duration in accordance with a defined schedule, wherein the websocket connection is configured for message exchange between the client device and a multiplexer; and transmit a plurality of messages shared within respective group-based communication system channels from one or more message distribution servers and stored within the buffer to the client device via the websocket connection.

18. The computer program product of claim 17, wherein periodically initializing the websocket connection comprises:

initializing the websocket connection in accordance with the defined schedule; and closing the websocket connection upon elapsing of an established time duration.

19. The computer program product of claim 17, wherein the defined schedule comprises:

a websocket open period identified as the time period having an established time duration during which the websocket connection is initialized, and a websocket close period during which the websocket connection is closed; and wherein the computer-readable program code portions further comprise an executable portion configured for storing messages shared within the group-based communication system channels within the buffer of the memory storage device during the websocket close period.

20. The computer program product of claim 19, wherein the computer-readable program code portions further comprise an executable portion configured to transmit messages shared within the group-based communication system channels to the client device via the websocket connection during the websocket open period.

21. The computer program product of claim 19, wherein the computer-readable program code portions further comprise an executable portion configured to transmit messages shared within the group-based communication system channels during the websocket open period to the client device in realtime.

22. The computer program product of claim 17, wherein the predefined duration is defined by a duration of time during which messages are being transmitted to the client device.

23. The computer program product of claim 17, wherein the computer-readable program code portions further comprising an executable portion configured to maintain a plurality of backend websocket connections with one or more message distribution servers, wherein each of the plurality of backend websocket connections corresponds to a group-based communication system channel.

24. The computer program product of claim 17, wherein each of the plurality of messages comprises a correspondence tag identifying a respective group-based communication system channel for display of the respective message on the client device within a respective display window corresponding to the group-based communication system channel, wherein each display window is displayed within a group-based communication system channel interface displayed via a display device of the client device.

* * * * *